United States Patent [19]

French et al.

[11] Patent Number: 4,685,067
[45] Date of Patent: Aug. 4, 1987

[54] CONTROL SYSTEM FOR PROGRAM CONTROLLED MANIPULATOR HAVING MULTIPLE TRIGGERED FUNCTIONS BETWEEN PROGRAMMED POINTS

[75] Inventors: Daniel B. French, Florence, Ky.; Richard E. Brookshire; Joseph W. Schnelle, both of Cincinnati, Ohio

[73] Assignee: Cincinnati Milacron Inc., Cincinnati, Ohio

[21] Appl. No.: 832,271

[22] Filed: Feb. 20, 1986

[51] Int. Cl.$^4$ .................. G06F 15/46; G05B 19/42
[52] U.S. Cl. .................. 364/513; 318/568; 364/193; 901/6; 901/41; 901/42
[58] Field of Search ............... 364/167–171, 364/191–193, 474, 513; 318/568, 573; 901/2, 6, 7, 20, 41, 42, 43; 414/730

[56] References Cited

U.S. PATENT DOCUMENTS

| | | | |
|---|---|---|---|
| 4,086,522 | 4/1978 | Engelberger et al. | 364/513 X |
| 4,338,672 | 7/1982 | Perzley et al. | 364/513 |
| 4,453,221 | 6/1984 | Davis et al. | 364/513 |
| 4,481,591 | 11/1984 | Spongh | 364/513 |
| 4,484,120 | 11/1984 | Olex et al. | 901/43 X |
| 4,506,335 | 3/1985 | Magnuson | 364/513 |
| 4,598,380 | 7/1986 | Holmes et al. | 364/513 |

OTHER PUBLICATIONS

Functional Specification—Time/Distance Trigger—Jun. 11, 1984.

Primary Examiner—Joseph Ruggiero
Attorney, Agent, or Firm—John W. Gregg

[57] ABSTRACT

An apparatus is provided for controlling the execution of functions associated with the automatic operation of a manipulator. While traditional function execution has been associated with arrival of a workpoint at or proximate to a predetermined point, the present invention provides for plural function execution between predetermined points. Two alternative embodiments are provided: a first embodiment controls a single output interface type and is unrelated to functions associated with predetermined points; a second embodiment provides multiple executions of any function normally associated with a predetermined point. Spacing between function executions associated with either embodiment is controlled as a function of distance specified by the operator. To produce a desired spacing, feedrate reduction is automatically effected in the event a programmed feedrate is incompatible with a specified function execution interval.

25 Claims, 15 Drawing Figures

CONTROL SYSTEM FOR PROGRAM CONTROLLED MANIPULATOR HAVING MULTIPLE TRIGGERED FUNCTIONS BETWEEN PROGRAMMED POINTS

BACKGROUND OF THE INVENTION

A. Field of the Invention

The present invention is directed to program controlled manipulators or "robots", and more particularly to an improvement in the program controlled manipulator described in U.S. Pat. No. 4,506,335 entitled "Manipulator With Controlled Path Motion" filed Mar. 19, 1985 in the name of T. J. Magnuson, the disclosure of which is incorporated herein by reference. It will be understood, however, that although the present invention has been described and illustrated in connection with the type of manipulator and control described in U.S. Pat. No. 4,506,335, the detailed description which follows also has application to other types of program controlled manipulator control systems.

B. Description of the Related Art

In the type of manipulator control with which the present invention is concerned, the path of motion of the manipulator arm associated with the manipulator is defined by establishing a number of intermediate points along the path of motion. Generally, the distances between adjacent points, sometimes referred to as "spans", define linear paths of travel, over which the acceleration, deceleration and velocity of the manipulator arm can be controlled in accordance with parameters established by the operator and a suitable manipulator control program.

For example, it is often preferable to define or program the intermediate points in space with respect to a rectangular coordinate system. This type of control requires that the coordinates of the intermediate programmed points be transformed to coordinates of the manipulator arm axes in order to produce coordinate motion to follow the predetermined path. A method and apparatus for accomplishing this type of controlled path motion is described in U.S. Pat. No. 3,909,600.

Upon ariving at a predetermined point along the path of travel of the manipulator arm, it is often desirable for the robot to perform or execute a particular function. For example, the manipulator arm may be provided with a welding gun which carries out a welding operation on a workpiece at one or more particular programmed points. In the implementation described in U.S. Pat. No. 4,506,335, the particular programmed function is performed when the manipulator arm reaches the end point of a particular span. No provision is made for the control to execute the programmed function (e.g. a weld cycle consisting of a weld gun closure and spot weld operation) between programmed points.

However, it is often desirable to separate function execution from physically ariving at a programmed point. That is, in many applications it is desirable to perform functions or operations at locations along the predetermined path of travel of the manipulator arm between programmed points. For example, in the case where a weld gun is used to perform a welding operation on a workpiece, it may be desirable to start closing the gun before the arm motion is completed in order to effectively reduce the overall cycle time of the operation. This type of simultaneous operation allows the gun closure and arm motion to be completed in unison regardless of the velocity during the move.

Generally, this has been accomplished in one of two ways. First, the user could manually program or schedule a number of intermediate data points at different distances from the desired end point based upon the programmed velocity, taking into account whether the manipulator arm was accelerating, decelerating or moving at constant speed. In other words, the user had to individually program each point along the pedetermined path of travel at which a particular desired operation was to occur. This method was time consuming to program and used valuable memory space for the extra data points within the programmable control. Moreover, each time the operator wanted to change the position of the function or task initiation, he had to first erase the old task position data point and then program a new one. Thus, while multiple functions or tasks could be performed between programmed points along the path of manipulator arm travel, each of the separate points had to be separately defined, stored and executed.

Another approach permits the performance of a single function to be initiated between programmed points by specifying a fixed time or distance relative to the end point in a particular span of motion. For example, if a welding operation is to be performed at the end point, the user can program the manipulator control so as to initiate closing the weld gun a predetermined time t before arriving at the end point during a particular span of motion. Thus, the overall cycle time of the welding operation is reduced since gun closure and arm motion are occurring simultaneously. This operation is illustrated diagrammatically in FIG. 4A where four designated programmed points A–D have been established along the path of travel of the manipulator arm, and are designed by the symbol ±. In this example, it is desired to perform a particular function execution, (e.g. a spot weld gun closure operation) designated by the symbol *, a fixed time t before arriving at each of programmed points B–D. As explained in U.S. Pat. No. 4,506,335, for example, an output may be produced from an I/O device such as a DAC (digital-to-analogue converter) to initiate a particular programmed function, e.g., a weld gun closure.

Figure 4A:
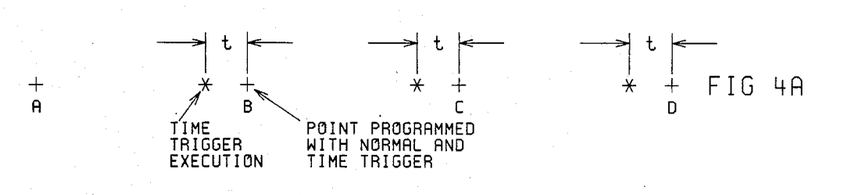
FIG. 4A–FIG. 4F is a diagrammatic representation of the trigger timing.
Figure 4B:
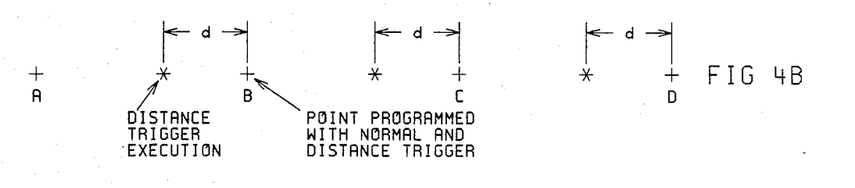

Similarly, FIG. 4B illustrates diagrammatically an exemplary application where a particular function designated by the symbol * (such as closure of a weld gun) is to be performed a fixed predetermined distance d before programmed points B–D.

One of the drawbacks to these approaches, based on fixed time and distances, however, is that only a single function can be specified between end points. In addition, the particular intermediate function or task, (e.g., closure of the weld gun) is initiated only on the basis of a single fixed time or distance relative to a programmed point along the path of manipulator arm travel irrespective of the velocity of the manipulator arm. For example, in cases where the trigger point is established on the basis of a fixed distance alone, unless the velocity, acceleration and deceleration of the manipulator arm during the particular span of motion are carefully taken into consideration in establishing the distance relative to the end point at which the function is to commence, the function may not be entirely completed before the end point is reached. Thus, in the case of a welding cycle, if the distance d from the end point at which the gun commences closure is not carefully chosen in view of the particular velocity, deceleration and acceleration of the manipulator arm in that area of travel, the weld gun may not be completely closed when the actual weld operation should commence. Again, this requires substantial user intervention with the program involving detailed calculations, and reduces the effectiveness and efficiency of the control. Moreover, this mode of operation cannot be used to perform the same task or different tasks multiple times between programmed points. This also illustrates the difficulty of using a trigger based on a fixed distance when trying to coordinate a time-oriented function.

In a first embodiment of the present invention, the control system is provided with a "Multiple Trigger" mode of operation which allows one or more functions specified by the user at the programmed end point to be performed at user-selected distance intervals between programmed points while the manipulator arm is in motion.

Figure 4C:
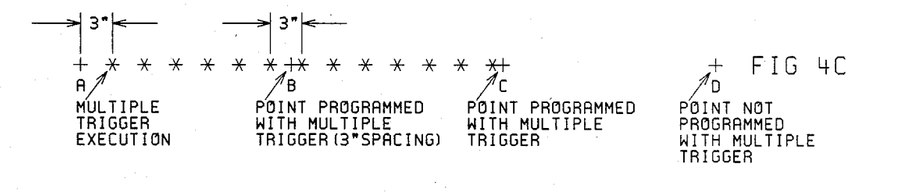

An example of this mode of operation is illustrated diagrammatically in FIG. 4C, where programmed points A-D along the manipulator arm path of travel are represented by the symbol ± and function executions to be performed intermediate those points (such as a weld gun closure or an entire weld operation) are represented by the symbol *. In the particular example shown, points B and C have been programmed with a Multiple Trigger so as to initiate a weld gun closure * every three inches, commencing from programmed point A. It will be understood that function executions * cease once a point at which a nonmultiple or nonsynchronized trigger is programmed is reached, e.g., points B and C. However, since point C has also been programmed with a Multiple Trigger, function executions continue at the selected spacing of 3" until the next end point C. It will also be observed that in this mode of operation, the multiple function executions cease when an end point is reached (e.g., point D) not programmed with a Multiple or a synchronous Trigger. Consequently, the Multiple Trigger mode allows the user to completely define a multiplicity of function executions during a span between programmed points during motion of the manipulator arm by merely specifying the desired intermediate function execution interval.

Figure 4D:
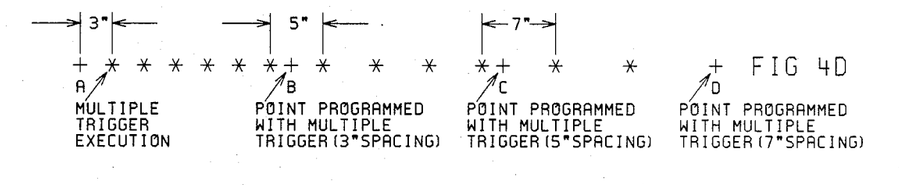

FIG. 4D illustrates diagrammatically the use of the Multiple Trigger mode to perform multiple functions at different user-selected distance intervals. Here, programmed point B has been programmed with a Multiple Trigger having a selected distance interval of 3", point C has been programmed with a Multiple Trigger having a selected distance interval of 5", and point D has been programmed with a Multiple Trigger having a selected distance interval of 7". In this case, within the span between programmed points A and B, the function execution * will be performed every 3 inches. At point B the 3" interval Multiple Trigger is turned off, and the 5" interval Multiple Trigger is turned on. Thus, between programmed points B and C, the distance interval between functions * will be 5 inches. Similarly, between programmed points C and D, the distance between function executions * will be 7 inches. In general, a function can be specified to execute on point or between points, but not both. However, by properly specifying the distance intervals between intermediate points, the last function execution may be caused to coincide with a programmed point.

As will become apparent from the detailed description which follows, this mode of operation is very useful where there is a group or sequence of functions to be executed while the arm is moving. For example, in a welding cycle, multiple welding operations can be made to occur between programmed points (e.g., A-D in examples hereinabove), thus conserving cycle time. Moreover, a different task can be performed at each intermediate point, e.g., a first task at a first point, a second task at a second point, etc., until all programmed tasks have been completed. Thereafter, the sequence may be completed commencing with the next intermediate point.

Figure 4E:
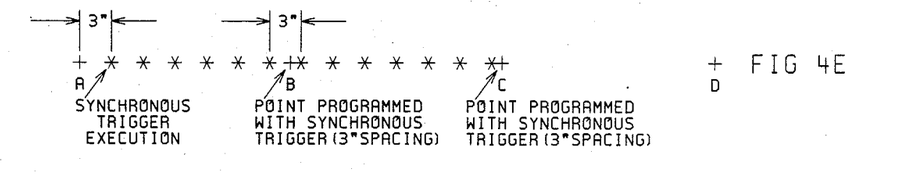

A second embodiment of the present invention comprises a more particularized implementation of the Multiple Trigger mode of operation and will be referred to hereinafter as "synchronous Trigger". The operation of the Synchronous Trigger is the same as the operation of the Multiple Trigger, except that the Synchronous Trigger mode does not effect what occurs at a programmed point. For example, FIG. 4E illustrates an exemplary situation where points B and C have been programmed with Synchronous Trigger with a 3" designated spacing. It will be observed that in this mode of operation, the Synchronous Trigger is not turned off and reinitiated at each intervening programmed point. Rather, as exemplified by point B, the Synchronous Trigger utilizes the last occurring Synchronous Trigger execution as the reference point so that the distance between intermediate points is constant, irrespective of intervening programmed points. The Synchronous Triggers continue to be produced until a programmed point is reached which is not programmed with a Synchronous Trigger, e.g. point D in FIG. 4E. At this position, the Synchronous Triggers are terminated.

Figure 4F:
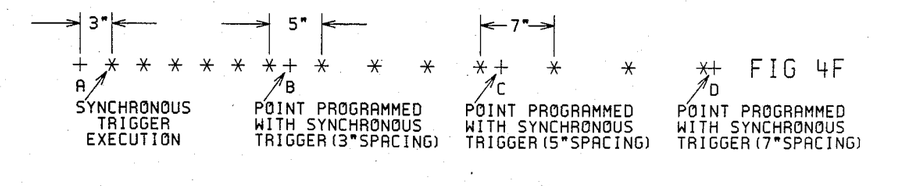

FIG. 4F illustrates a situation using the Synchronous Trigger where it is desired to change to different distance intervals between adjacent programmed points, in a manner similar to that described hereinabove in connection with the Multiple Trigger example of FIG. 4D. Thus, as illustrated in FIG. 4F, point B has been programmed with a Synchronous Trigger having a 3" distance interval, while point C has been programmed with a Synchronous Trigger having a 5" distance interval. It can be seen that the Synchronous Trigger executions bridging programmed point B exhibit a 5" distance interval inasmuch as the execution point immediately preceding programmed point B is used as the reference. Similarly, for the change from a 5" to 7" distance interval, the Synchronous Trigger execution immediately preceding programmed point C is used as the reference. As in the case of Multiple Trigger, the Synchronous Triggers are performed until a programmed point is reached that does not have an associated Synchronous Trigger.

In the preferred embodiment of Synchronous Trigger to be described, the Synchronous Triggers are used to produce sync pulses which are unrelated to any function execution at programmed distances via a DAC output. These sync pulses may then be used for controlling a manipulator arm mounted ultrasonic inspection transducer for checking the integrity of spot welds produced by a weld gun also carried by the manipulator arm. Consequently, the Synchronous Trigger operates as a background function to other functions being performed on point by the control system, which are not affected.

In the type of computer-based control system used in the present invention, a Multiple or Synchronous Trigger can only be produced as often as the system requests information from the servos, i.e. the system update or interrupt interval, which may be on the order of 10-20 milliseconds. This may cause errors in the position at which a Multiple or Synchronous Trigger actually occurs if the manipulator arm is accelerating, decelerating or moving at higher velocities. For example, if the manipulator arm is programmed to move at a velocity of 25 in/sec, and the system interrupt time is 15 milliseconds, a trigger can only be produced every 15 milliseconds corresponding to a manipulator arm travel distance of 0.375 inches. Consequently, for this example, the minimum trigger resolution is 0.375 inches.

In this type of situation, the precision of the Synchronous or Multiple Trigger function can be improved by adjusting the velocity of the manipulator arm downwardly at the beginning of its movement so that the distance interval between system interrupts (sometimes referred to as the "subspan" or "minispan" distance) is an exact submultiple of the Trigger distance. For instance, in the example just given, if the multipulator arm velocity is reduced to 6.67 in/sec, the Multiple Triggers will occur at intervals of 0.1 inches, corresponding to an elapsed time of 15 milliseconds, which is the system interrupt time. Thus any desired Multiple or Synchronous Trigger interval can be specified by appropriately adjusting the manipulator arm velocity during a particular minispan. This mode of operation ("Exact Mode"), will be described in more detail hereinafter in connection with the use of the type of manipulator arm control described and illustrated in U.S. Pat. No. 4,506,335.

DESCRIPTION OF THE PREFERRED EMBODIMENTS

For purposes of illustrating the invention, a manipulator arm and control combination constituting a preferred embodiment will be described. The manipulator arm and control correspond to those manufactured by Cincinnati Milacron Inc., the assignee of the present invention. It is to be understood that the particular structure of the manipulator arm used with the preferred embodiment is not to be construed as a limitation of the present invention. Rather, any machine operating under computer control may be used, particularly those incorporating serially linked axes of rotary motion controlled by interpolation of intermediate points along the predetermined path of the manipulator arm defined with reference to a rectangular coordinate system or another suitable coordinate system independent of the machine coordinate system, such as that described in U.S. Pat. No. 4,506,335.

Figure 1:
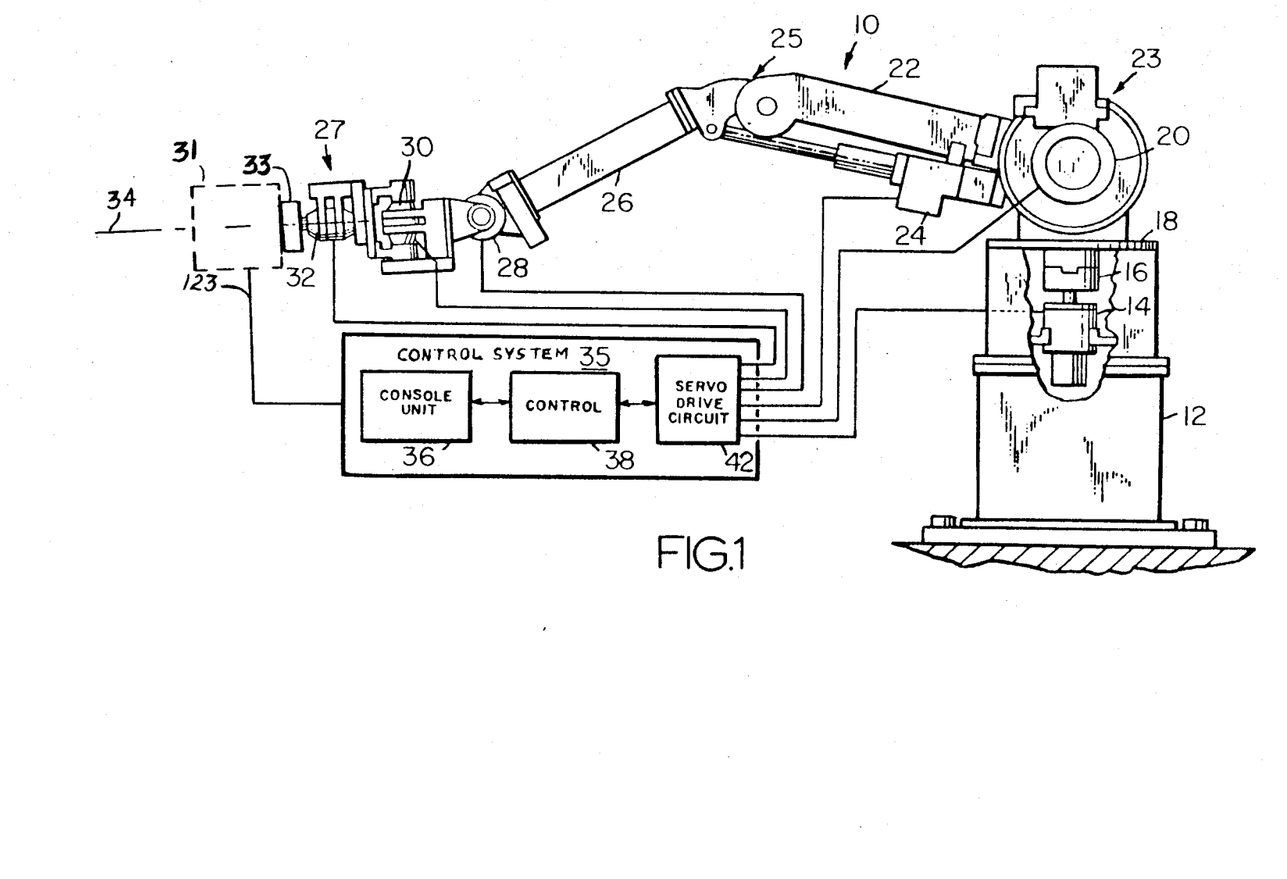
FIG. 1 shows a typical articulated manipulator arm and the schematic connection thereof with the control system of the present invention.

Referring to FIG. 1, an articulated manipulator 10 is shown connected to a robot or manipulator arm control 35 and carrying a function element 31 responsive to a control signal on output line 123. Function element 31 may comprise any type of servomechanism responsive to the magnitude of an analogue or digital control signal on line 123 such as a welding gun, adhesive application gun, spray painter, ultrasonic inspection sensor, etc..

The control signal on output line 123 may be used, for example, to close a welding gun, commence a spot welding operation, etc.

The manipulator 10 includes base 12 upon which is rotatably mounted the shoulder plate 18 and within which are the shoulder rotation actuator 14 and the intermediate coupling 16. Actuator 14, coupling 16 and mounting plate 18 cooperate to effect rotation of the manipulator structure about a vertical axis passing through the center of plate 18. Upper arm 22 is rotatably supported upon plate 18 at the shoulder joint 23 and rotated about a horizontal axis intersecting the vertical axis through the center of the shoulder joint 23. Rotation of the upper arm 22 about the axis is effected by actuator 20. A forearm 26 is connected to upper arm 22 at an elbow joint 25 and is rotated thereabout by means of actuator 24 which may be a linear actuator such as a piston and cylinder or screw and nut. The actuators 14, 20 and 24 are sufficient to effect motion of the forearm 26 to place the end thereof in any position within the volume described by the mechanical limitations of the structure.

To maximize the flexibility of motion achieved by control of the manipulator arm, three additional axes of motion follow forearm 26. These three additional axes are intended to effect control over the orientation of the function element 31 carried by the manipulator arm with respect to a relocatable point of reference. The first of these orientation axes corresponds to a rotation about a horizontal axis at the end of the forearm 26 driven by actuator 28 to effect changes in pitch of the function element 31 carried by the manipulator. The second orientation axis is vertical and perpendicular to the first and effects changes of yaw of the function element 31 carried by the manipulator and is driven by actuator 30. The third orientatio axis for controlling roll is perpendicular to the second axis and is driven by actuator 32. These three orientation axes constitute the wrist 27 of the manipulator 10.

At the end of wrist 27 is the face plate 33 to which is mounted the function element 31 of the type described hereinabove. The stored program for controlling the motion of function element 31 specifies positions of a centerpoint 34 and orientations of the function element 31 with respect to the relocatable centerpoint 34.

Control system 35 includes a console unit 36 to permit communication between an operator and the manipulator 10, a control 38 for processing a stored program directing the movement of manipulator 10, and a servo-drive circuit 39 responsive to control 38 for controlling the machine actuators 14, 20, 24, 28, 30 and 32. Since the particular type of actuators and drive circuits do not form a part of the present invention, further details of these devices are not provided.

Figure 2:
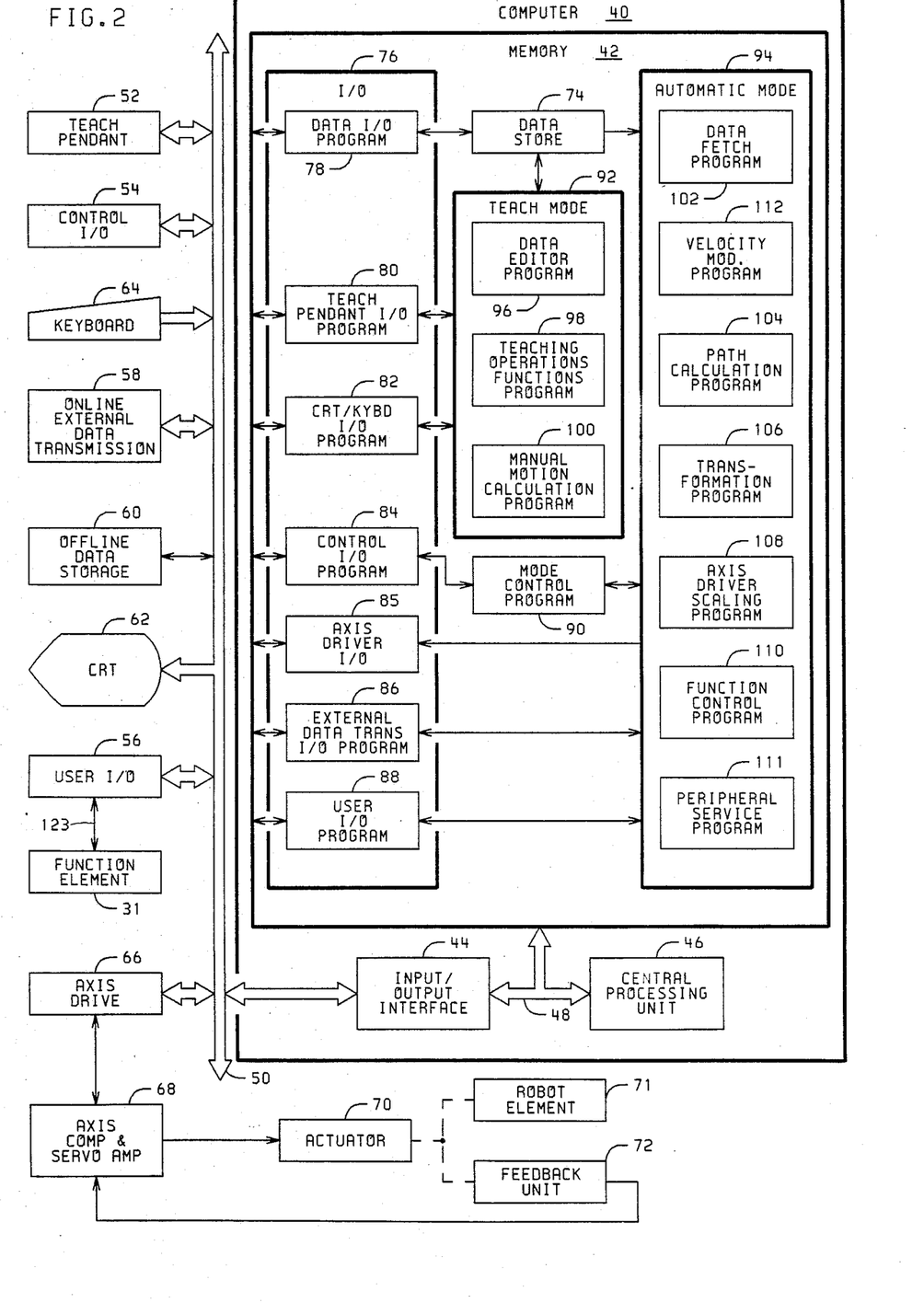
FIG. 2 is a block diagram of the control system with its associated input and output interface modules.

Referring to FIG. 2, a detailed block diagram of the control system 35 is illustrated. Control system 35 includes a programmable general purpose digital computer 40 comprised of a memory 42, a central processing unit 46 and an input/output interface 44. These three elements are interconnected by bus 48. Interaction between computer 40 and the manipulator 10 and an operator are carried out by signals passed over the external bus 50 connected to a number of peripheral devices. The peripheral devices most suitable for use by an operator include the teach pendant 52 for manually producing motion commands during a Teach mode of operation to generate a stored program, keyboard 64 for entering information to computer memory 42, and CRT 62 for displaying data relating to the current activity of the manipulator and its stored program.

The peripheral devices used to interface the manipulator 10 to control system 35 include: the control input/output interface 54, which exchanges a number of discrete device signals between the manipulator and control system 35 necessary for the operation of manipulator 10, the user input/output interface 56 which exchanges signals on line 123 to and from application dedicated devices such as function element 31, and the axis drive interface 66 which directly controls the motion of the actuators. The axis drive 66 accepts data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. A feedback device 72, mechanically connected to actuator 70 or robot element 71, provides a feedback signal representing the actual motion of the driven element of the robot arm. Although there are several configurations for control of the servomechanism loop for each element of the robot arm, in the preferred embodiment, the axis drive 66, servoamp 68, actuator 70 and feedback element 72 are utilized in numbers equal to the number of controlled axes on the manipulator.

For example, user I/O 56 may comprise one or more digital-to-analogue converters (DACs) which receive data in digital form from bus 50 representative of a particular voltage magnitude, and convert the digital data to the corresponding analogue voltage. Generally, the DACs are independent of each other, and separately addressable so that each may be caused to produce a particular analogue voltage output at a particular point in time.

It will also be understood that the DAC output voltage may be caused to assume two discrete voltage levels for applications which only require an on/off control voltage. Thus, for example, in controlling a weld gun comprising function element 31, the output voltage from one DAC forming part of user I/O 56 may be used to close the weld gun during a welding cycle, while the output voltage from another DAC forming part of user I/O 56 may be used to cause the weld gun to actually perform the welding operation.

Two further peripheral devices permit the exchange of program data. First, the on-line external data transmission interface 58 represents a device which allows data to be entered into the computer 40 from an external data store while the manipulator is executing a cycle of operation. Second, an off-line data storage interface 60 is provided for allowing program data to be input to the computer by means of such devices as a punched tape reader, a cassette reader, etc.

The memory 42 within computer 40 is comprised of two primary components. The first is the data store 74 which stores all numerical data information, and the second component defines the operating system of the manipulator. The operating system is a set of control programs directing the operation of computer 40 to effect the generation of the user program and the execution of the stored user program. For purposes of illustration, the operating system programs are shown in functionally related sets including the input/output set 76, the Teach mode set 92, and the Automatic mode set 94.

Included in the input/output set 76, are the data I/O program 78, teach pendant I/O program 80, a CRT and keyboard I/O program 82, a control I/O program 84, an axis driver I/O program 85, an external data transmission program 86 and the user I/O program 88. Each of these input/output programs corresponds to a different type of peripheral device interfaced to the control and is effective to control the signal exchange between the particular peripheral device and the computer 40.

The operating system also contains a mode control program 90 for switching control of the computer between the various operating modes, for example, Manual, Teach, Automatic, etc. Since only the Teach and Automatic modes are required for the disclosed invention, only these modes will be described. Within the Teach mode system 92 are the data editor program 96 and a teaching operation function program 98. These two programs control the operation of the manipulator during the Teach mode, and the specifics of these programs are either described in U.S. Pat. No. 3,920,972 (the disclosure of which is incorporated herein by reference) or are available from Cincinnati Milacron, Inc.

The Automatic mode set 94 includes a data fetch program 102, a path calculation program 104, a transformation program 106, an axis driver program 108, a function control program 110, a peripheral service program 111, and a velocity modification program 112. Details of the path calculation program are provided in U.S. Pat. No. 4,506,335 and details of the remaining programs are either described in U.S. Pat. No. 3,909,600 (the details of which are incorporated herein by reference) or are available from Cincinnati Milacron, Inc.

In the description which follows, reference should be made to U.S. Pat. No. 4,506,335, where elements similar to those described herein are similarly designated. In particular, FIGS. 1, 2, 3, 7, 8 and 9 of the present disclosure correspond generally to FIGS. 1, 2, 5A, 6B, and 5B, respectively, of U.S. Pat. No. 4,506,335, where elements have been similarly designated herein and changes or differences noted where appropriate. It will be understood that the processing described in the flowcharts described herein or otherwise referenced may be implemented as firmware in a ROM embodied in memory 42.

Initially, certain parameters must be entered by the user to define the distance or time intervals at which the selected functions are to be performed. This may be accomplished during the Teach mode of operation as generally described in U.S. Pat. No. 3,909,600 or U.S. Pat. No. 3,920,972, and in connection with the Trigger routine 400 illustrated in the flow diagram of FIG. 5 herein.

Figure 5:
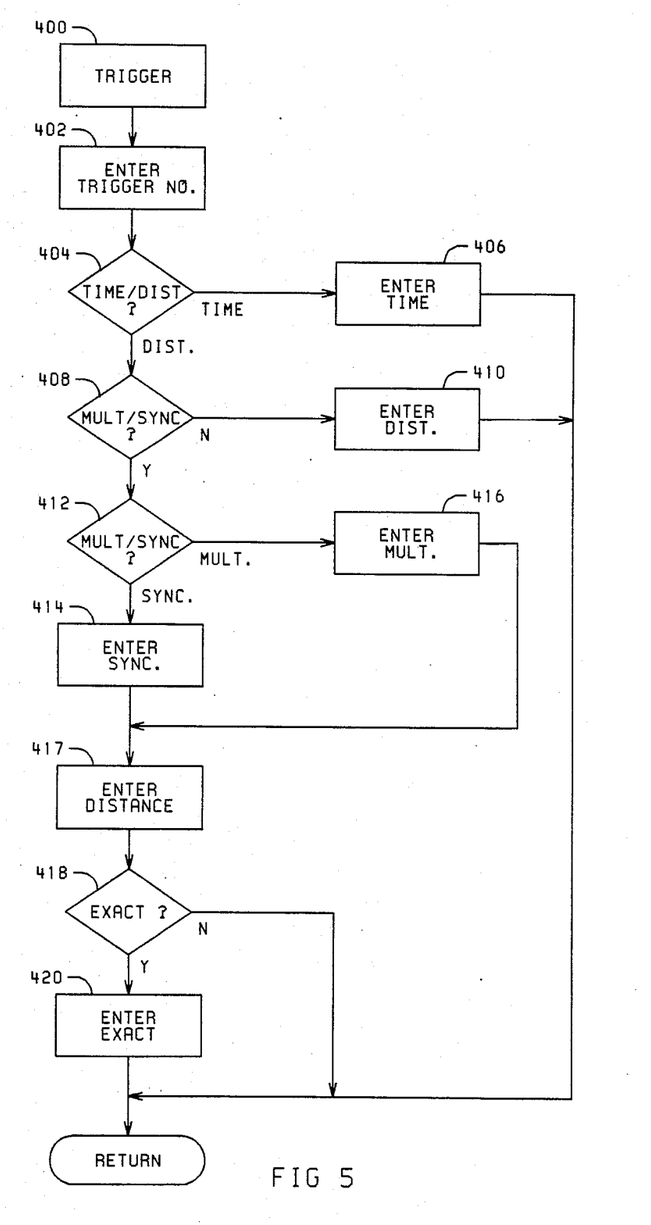
FIG. 5 is a flowchart illustrating the processing associated with the selection of the trigger mode of operation during the teach mode.

Referring to FIG. 5, the user first selects the particular trigger number which is to be programmed via process step 402. Although for purposes of an exemplary showing, the present invention is described and illustrated in connection with a single trigger, it will be understood that any number of programmable triggers may be incorporated and programmed according to the scheme described. For example, if there are a total of sixteen individually programmable triggers, the user may select in process step 402 any one of such triggers and assign to it the trigger type and values described hereinafter. Thus, for example, one trigger may be used to control closure of a weld gun, while a separate trigger may be used to control the spot weld operation.

If the programmed function for the particular trigger selected is to be initiated on the basis of a fixed time or distance from a programmed point in the mode of operatio described hereinabove in connection with FIG. 4A and FIG. 4B, the user selects this mode of operation in decision step 404. If the programmed function is to be initiated on the basis of time alone, the user enters the appropriate time value. The subsequent processing will then produce time triggers as described previously in connection with FIG. 4A.

If the programmed function is to be initiated on the basis of distance alone, the no branch of decision step 408 is followed (indicating that the Multiple and Synchronous Trigger modes of operation were not followed), and the user enters the appropriate distance value via process step 410. Subsequent processing will then produce distance triggers as described previously in connection with FIG. 4B.

If the selected interval is to be based on a distance according to the Synchronous Trigger or Multiple Trigger modes described hereinabove, the yes branch of decision step 408 is followed and the user designates the appropriate Synchronous or Multiple Trigger mode of operation via decision step 412 which is then entered via process step 414 or 416, respectively. The desired distance interval is then entered in process step 417. Subsequent processing then produces Multiple or Synchronous Triggers as previously described in connection with FIGS. 4C-4F.

In either mode of operation, the user may select the Exact mode described hereinabove via process steps 418 and 420 in order to reduce the manipulator arm velocity to increase the precision of the trigger points. This sequence establishes all of the initial operating instructions for the main processing of the control system of the present invention.

Figure 3:
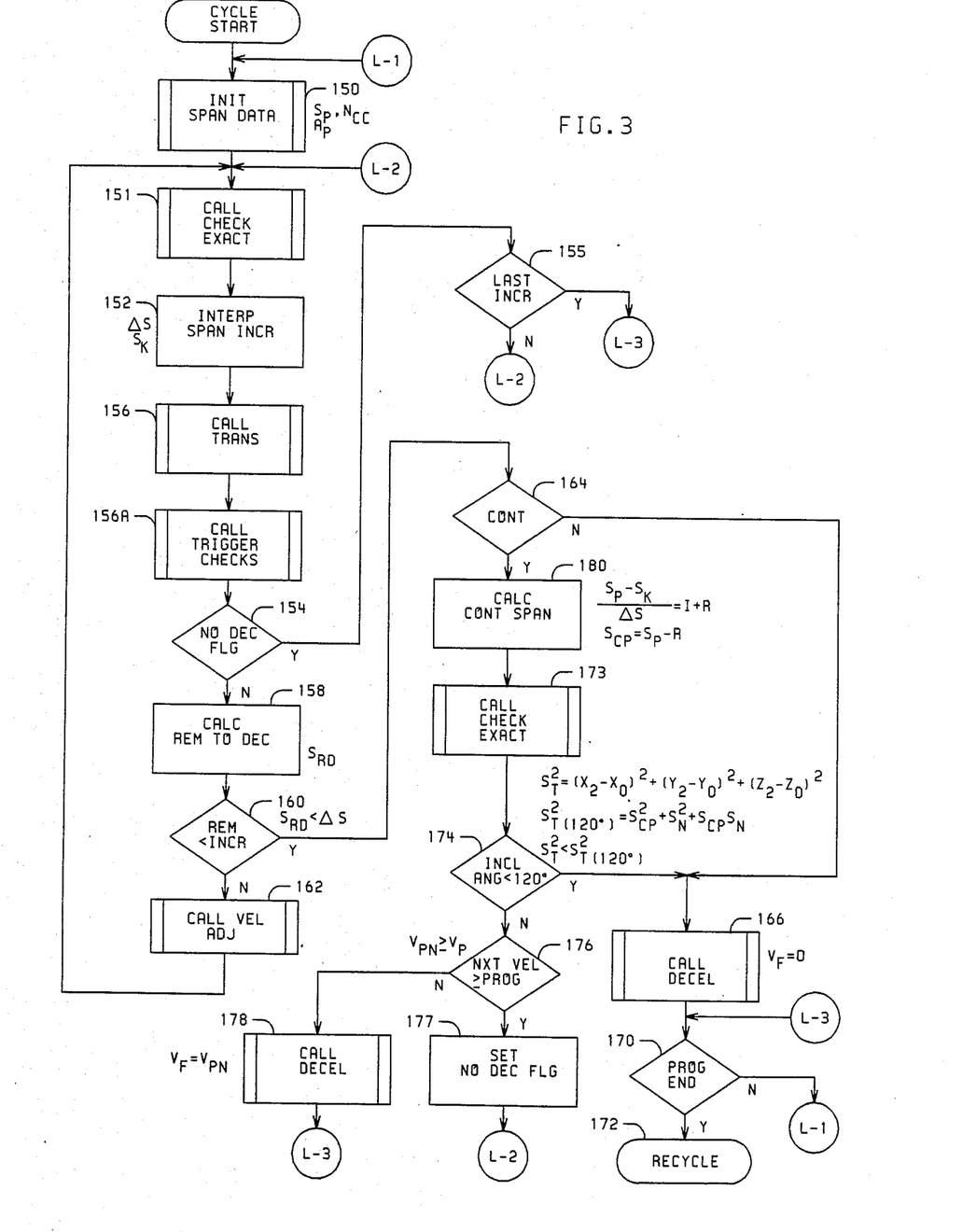
FIG. 3 is a flowchart of the principal control procedure effecting motion control.

The overall cycle of operation of manipulator 10 in the Automatic mode is illustrated by the flowchart of FIG. 3, where the processing described is similar to that disclosed in FIG. 5A of U.S. Pat. No. 4,506,335. At process step 150 the control initializes the span data required to interpolate the motions between two programmed points P0 and P1 at a programmed velocity Vp. Values for the programmed span length Sp, the coordinate component ratios $N_{cc}$ and a nominal acceleration are produced by the procedure associated with step 150.

At this point, a call is made to the Check Exact subroutine which determines whether or not the Exact mode of operation has been selected for the particular span under consideration. The functioning of this subroutine will be described hereinafter. For the present discussion, it will be assumed that the Exact mode has not been selected. At this point, the processing is somewhat different from that described in U.S. Pat. No. 4,506,335.

At process step 152 an increment along the path is interpolated to produce an incremental distance $\Delta S$ and an accumulated incremental distance $S_K$. Process step 156 calls the Trans subroutine to effect a transformation of the interpolated intermediate point to the generalized coordinates.

At this point, the processing again is somewhat different from that described in U.S. Pat. No. 4,506,335. The processing branches to the Trigger Checks subroutine 156A illustrated in FIG. 6. This subroutine determines where in the span the Multiple Trigger or Synchronous Trigger is to be executed, and also sets the parameters necessary to request from the control system 35 that a mid-span function (Multiple Trigger or Synchronous Trigger) is to be executed.

Figure 6:
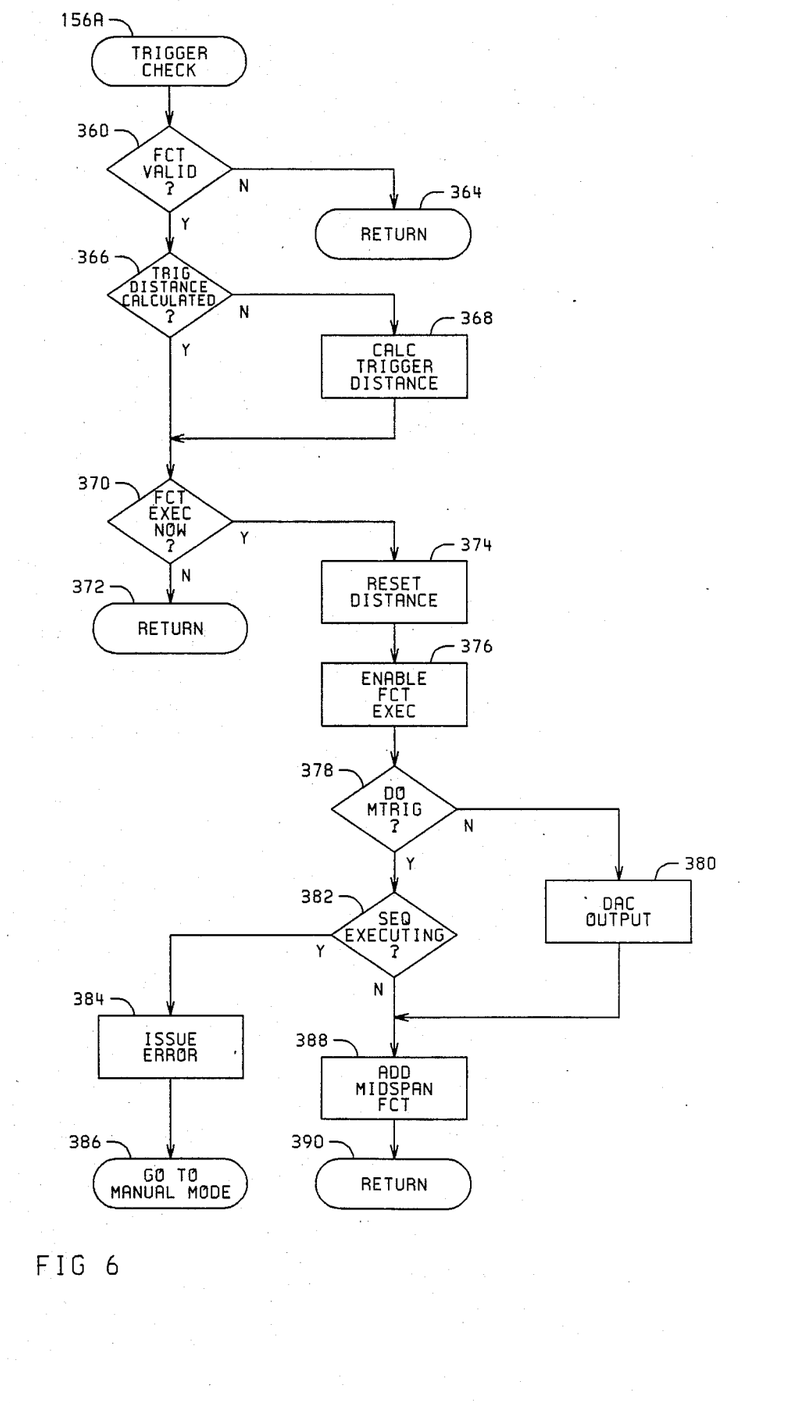
FIG. 6 is a flowchart illustrating the Trigger Checks subroutine associated with the processing of the present invention.

If at decision step 360 it has been determined that the function designated can be multiply triggered within the span, a test is made at decision step 366 to determine whether the distance interval between the positions at which the function is to be triggered has been calculated. If these distance intervals have been calculated, the processing proceeds to decision step 370. If the distance intervals have not been calculated, the processing proceeds to calculate them. For example, in the case of the Multiple or Synchronous Trigger, each distance interval within a particular span is an integral multiple of the user-selected interval distance as described hereinabove.

Similarly, in the case of the Synchronous Trigger, the interval distance utilizes either the preceding programmed point or the last occurring Synchronous Trigger execution as the reference point so that the distance between intermediate points is constant, irrespective of intervening programmed points. The processing also establishes whether the Synchronous Triggers will continue to be produced inasmuch as a programmed point has been reached which is not programmed with a Synchronous Trigger.

Returning to FIG. 6, decision step 370 determines whether the manipulator arm has moved a sufficient distance based upon the user-specified distance interval to execute the next function. If the manipulator arm has not yet reached the next function execution point, the Trigger Check subroutine returns to the main processing of FIG. 3. On the other hand, if the distance moved since the last trigger point (D2) is greater than or equal to the interval distance between function executions specified by the user, indicating that the function should be executed at this time, the processing proceeds to step 374.

In process step 374, the Trigger Check subroutine resets the position parameter D2 to begin calculating the position for the next user-selected interval distance. The function to be executed is then enabled, in process step 376, although it is not yet actually executed at this point.

The processing next decides whether a Multiple Trigger has been programmed for the particular user-selected interval distance under consideration. If a Multiple Trigger has been programmed, the processing proceeds to process step 382; if not, the processing proceeds to process step 380.

In the particular embodiment described, the Synchronous Trigger mode is designed to produce one or more sync pulses from a DAC associated with user I/O 56 via process step 380, irrespective of any intervening programmed points. Thus, the DAC output can be superimposed on the normal system operation without affecting any of the other function executions. Moreover, in the embodiment described, the Synchronous Trigger output from the DAC can be made to occur irrespective of whether another function has not yet completed executing.

On the other hand, in the embodiment described, the Multiple Trigger output cannot occur if an execute sequence is still in progress from a previous trigger. That is, each of the triggers can only control a single function at a time. Also, as noted above a function can be specified to execute on point or between points, but not both. Consequently, if decision step 382 determines that a previous trigger has not completed its execution, an error is issued in process block 384, and process execution branches to the Manual mode of operation for remedial action.

The particular Multiple or Synchronous trigger that is to be executed is then stored in memory by process block 388, and the subroutine returns to the main processing of FIG. 3.

From this point, the processing commencing with decision step 154 in FIG. 3 is the same as described in FIG. 5A of U.S. Pat. No. 4,506,335, with the exception that the Check Exact subroutine is again called in step 173 following the span calculation in process step 180. As will be described in more detail hereinafter, this subroutine determines whether the velocity of the manipulator arm should be reduced in order to increase the precision of the trigger positions. In additio, it will be observed that the programmed function is no longer executed at the end of span following the call to the DECEL subroutine in process step 166 as was previously the case in U.S. Pat. No. 4,506,335, but is executed in connection with the Process Function subroutine of FIG. 9.

Figure 7:
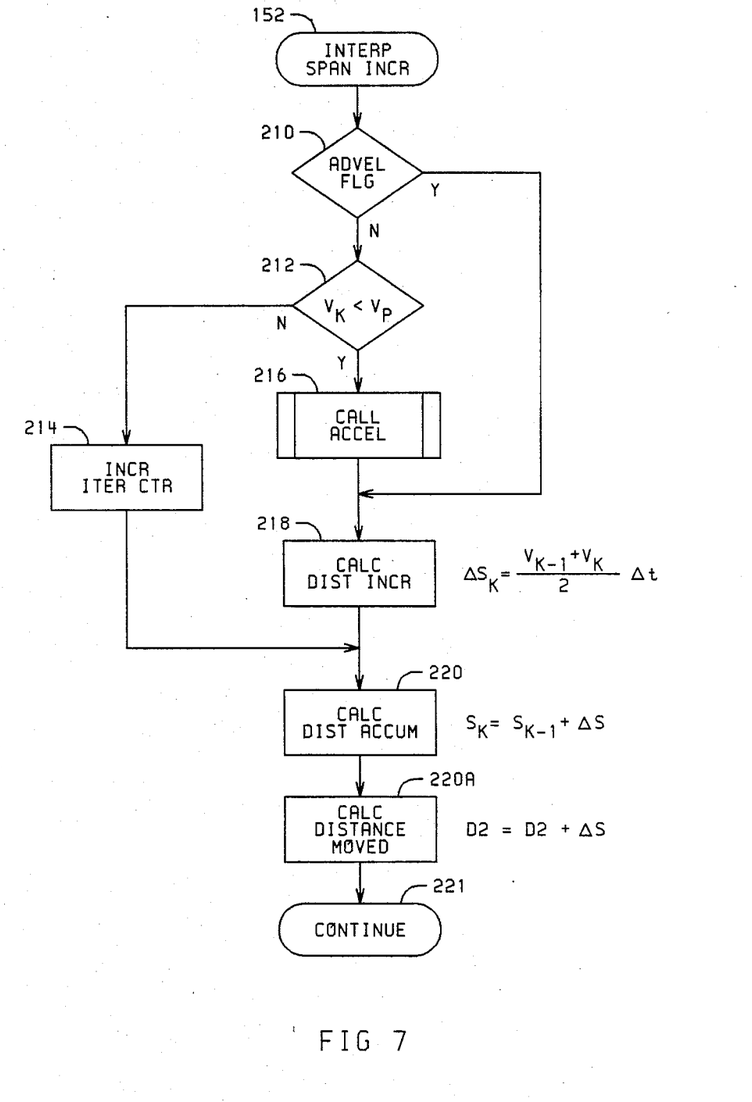
FIG. 7 is a flow diagram for the INTERP SPAN INCR subroutine associated with the processing of the present invention.

FIG. 7 illustrates the flow diagram for the INTERP SPAN INCR subroutine. This routine interpolates a span increment as described in more detail in U.S. Pat. No. 4,506,335. The only change to this subroutine from that disclosed in the patent is that the actual distance moved by the manipulator arm $\Delta S$ is calculated in process step 220A in order to derive the distance parameter D2 described hereinabove in connection with the Trigger Check subroutine. Following completion of this subroutine, the processing returns to the main program of FIG. 3.

Figure 8:
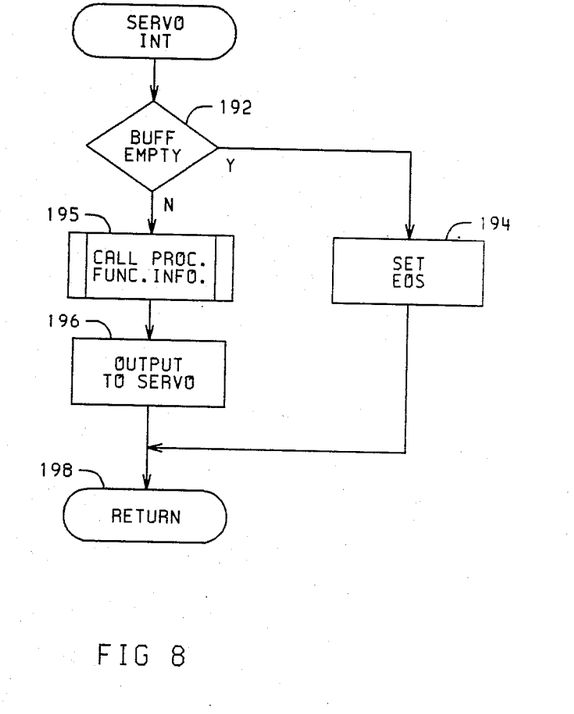
FIG. 8 is a flow diagram for the SERVO INT subroutine associated with the processing of the present invention.

FIG. 8 illustrates the Servo Interrupt subroutine for servicing the actuator servomechanisms. While the overall cycle of operation is being executed by the main processing of FIG. 3, an independent servo interrupt service routine is processed. This processing is essentially the same as the Servo Int subroutine described in FIG. 5B of U.S. Pat. No. 4,506,335, except that there is an additional call to the Process Function Information subroutine shown as process step 195, and described in more detail in FIG. 9 herein.

Figure 9:
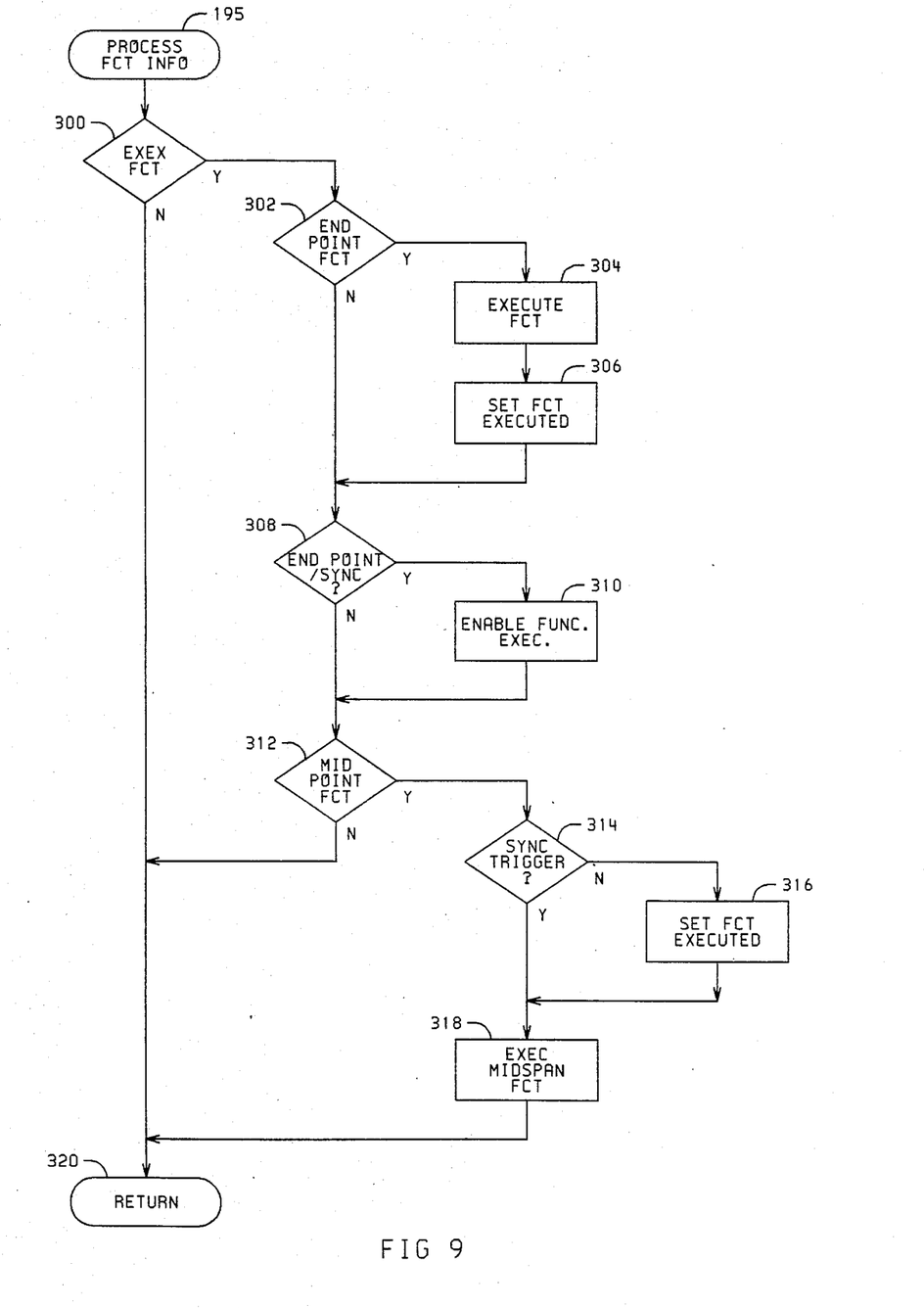
FIG. 9 is a flow diagram for the PROCESS FUNCTION INFORMATION subroutine associated with the processing of the present invention.

The Process Function Information subroutine 195 illustrated in FIG. 9 controls the midspan and on point execution of all functions to be performed by the function element 31 associated with the manipulator arm. First, a test is made in process step 300 to determine whether or not a programmed function (e.g., a weld gun closure) is associated with the current system interrupt, since a function can only occur at each system interrupt.

If there is no function associated with this interrupt, the processing simply returns to the Servo Int subroutine of FIG. 8.

If a programmed function is to be performed, the processing in process step 302 determines whether the function is to be executed at the end programmed point, i.e. on point, or at an intermediate position while the manipulator arm is moving in midspan. If the function is an end point function, it is executed in process step 304, and a flag is set in process step 306 to indicate that the function has been executed.

The processing then determines whether it is proper to execute an end point and Synchronous Trigger function within the same interrupt period. This situation can only occur when a Synchronous Trigger is to be executed during the same system update period associated with arriving on point. In the specific embodiment described, the Synchronous Trigger is treated as a background task to normal function execution, so that the function associated with the end point must be executed when arriving on point. This operation is carried out by process step 310.

A decision is then made in test block 312 whether the programmed function is to be executed while the manipulator arm is moving in midspan. If this is the case, a further test is made in process block 314 to determine whether the midspan function is a Synchronous Trigger. If the trigger type to be executed is a Synchronous Trigger, normal function execution must still be allowed to occur when arriving on point. Thus, the Synchronous Trigger is executed in midspan by means of process step 318, and the subroutine returns to the main processing of FIG. 3.

If a Multiple Trigger is to be executed in midspan, the execution of the function associated with the end point is merely moved to the midspan point or points where the Multiple Trigger function(s) is to be executed. The Multiple Trigger function is then executed as described hereinabove in process step 318, and the processing returns to the main processing. At the same time, inasmuch as the function was not executed on point, a function executed status flag is set in process step 316 in a manner similar to that previously described for process step 306 to indicate that the programmed function has been executed, to prevent the function from also being executed on point.

Consequently, at the end of the Process Function Information subroutine 195, the midspan functions, particularly the Synchronous Trigger and Multiple Trigger functions, have been executed.

As noted hereinabove, under some circumstances, the actual distance between Synchronized Trigger positions may be affected by changes in the velocity of the manipulator arm between programmed points. This is due to the fact that positions intermediate the programmed points are dependent upon the finite interval between system updates. For example, in the exemplary embodiment described, the control iteratively interpolates in a linear fashion intermediate locations or positions between the programmed points. This interpolation is accomplished at a fixed iteration interval defined by the recurrence of the servointerrupt signals, which generally occur about every 15 milliseconds. Consequently, establishment of a Synchronous Trigger or Multiple Trigger position can only be made at one of these system interrupt intervals, i.e. every 15 milliseconds.

For example, assume that the manipulator arm has been programmed to move over a particular distance at a velocity of 25 in/sec, and that it is desired that a Synchronous Trigger pulse be produced every 0.1 inches. At this manipulator arm velocity, the Synchronous Trigger would ideally be produced every 4 milliseconds. However, since a trigger can only be produced at the system interrupt intervals, the first Synchronous or Multiple Trigger will be produced after 15 milliseconds has elapsed, i.e. at the first system interrupt, corresponding to an actual travel distance of 0.375. Thus, the first three Synchronous or Multiple Triggers which should have been produced at 4, 8 and 12 milliseconds (corresponding to 0.1, 0.2 and 0.3 inches), respectively, will be missing, and the fourth Synchronous or Multiple Trigger (which should have been produced at 0.4 inches) will be in error by 0.025 inches. This demonstrates that the minimal obtainable distance between trigger positions is generally proportional to the manipulator arm velocity. This problem may be compounded where the manipulator arm is accelerating or decelerating, rather than moving at a constant velocity.

Figure 10:
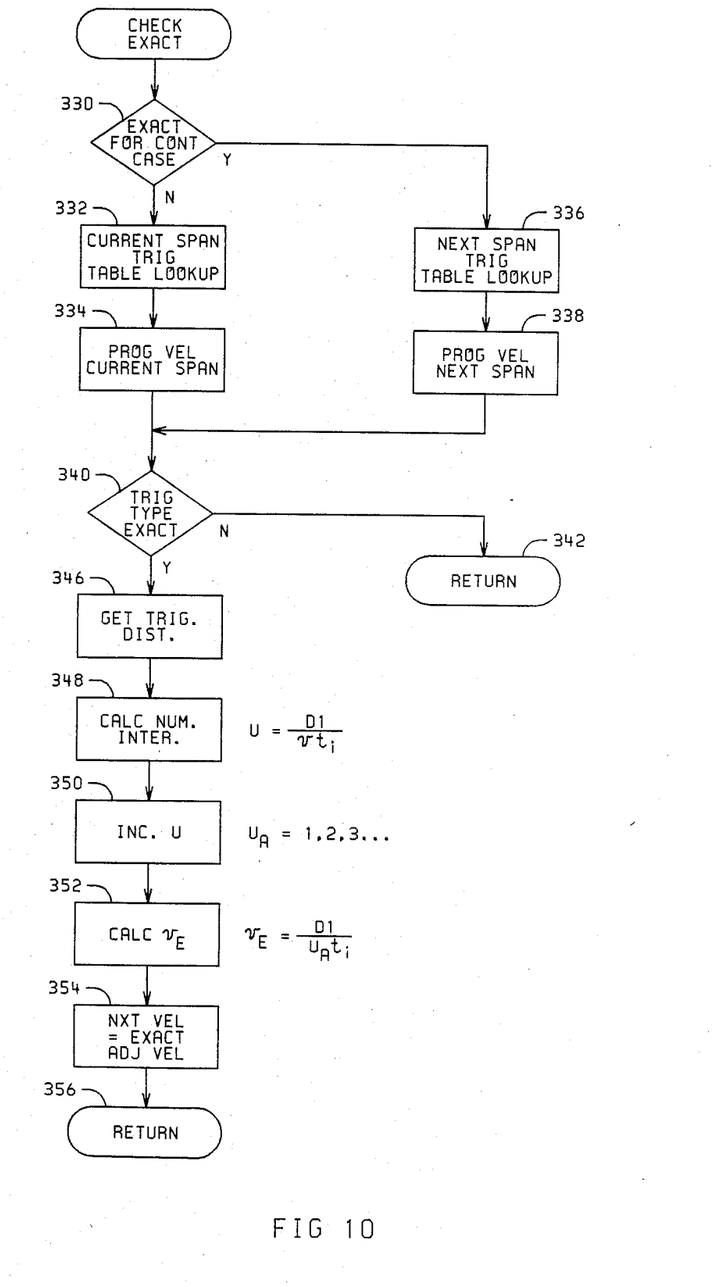
FIG. 10 is a flow diagram for the CHECK EXACT subroutine associated with the processing of the present invention.

The Check Exact subroutine illustrated at process steps 151 and 173 in FIG. 3, and described in more detail in the flow diagram of FIG. 10, compensates for this error by adjusting the manipulator arm velocity downwardly at the beginning of a move so that the distance traveled between system interrupts is an exact submultiple of the trigger distance. Consequently, the maximum velocity for a manipulator arm move can be specified and the arm will be slowed to the fastest possible velocity for the particular distance involved.

For example, assume that the Multiple or Synchronous Trigger is to occur at distances of 0.1 inches, and that the system interrupt time is 15 milliseconds. Under these conditions, if the manipulator arm velocity is programmed to be 6.67 in/sec, the Synchronous or Multiple Trigger will occur at distance intervals of 0.1 inches coincident with the system interrupt. Similarly, if the manipulator arm velocity is further reduced to 3.33 in/sec, a trigger will be produced every other system interrupt, etc.

Turning to the Check Exact subroutine of FIG. 10, a test is first made in decision step 330 to determine whether the call to the Check Exact subroutine resulted from process step 151 or process step 173 (see FIG. 3). The call from process step 151 will occur when the manipulator arm has finished the acceleration and constant velocity phases of the move, and is going to decelerate to the next span velocity because the end point is a continue point. As explained in more detail in U.S. Pat. No. 4,506,335, continue points are marked by the presence of a function attribute indicating that the function is to be executed while motion continues. However, because the next succeeding programmed point has been specified with the Exact parameter as described hereinabove in connection with the Teach mode of FIG. 5, the programmed velocity for that span must be adjusted. This requires that the control system know this ahead of time so that the manipulator arm can be decelerated to the actual velocity of the next span.

This is accomplished in the Check Exact subroutine of FIG. 10 by determining the trigger type from the trigger table established during the Teach mode described hereinabove in FIG. 5 (process step 336), and by utilizing in the subsequent velocity calculation the programmed velocity for the next span in process step 338.

In the case where the call to the Check Exact subroutine was made from process step 151, where a continue point is not involved, the trigger type is determined from the parameters stored in association with the programmed point at the end of the current span in process step 332 and the programmed velocity of the current span is used (process step 334) in subsequent velocity calculations.

If the Exact Function is not to be applied to the particular trigger type involved, a return is made to the main processing in decision step 340 inasmuch as the velocity will not be adjusted. However, if the Exact Function is to be applied to the trigger, the trigger distance is obtained in process step 346 from the trigger distance table established during the Teach mode processing of FIG. 5. It must be kept in mind that the trigger distance value will either coincide with the current end point, or the next span's end point depending upon whether the call to the Check Exact subroutine was made from process step 151 or 173 of FIG. 3.

The number of system interrupts per trigger distance interval is then calculated from the relationship $$U = D1/vt_i$$

where
U = number of interrupts per trigger distance interval D1
D1 = programmed trigger distance interval
v = programmed manipulator arm velocity
$t_i$ = interrupt interval It will be observed that the trigger distance interval D1 and velocity v are the actual programmed trigger distance interval and manipulator arm velocity, respectively, for either the current end point or the next span's end point, depending on whether the call was made from process step 151 or 173 as described earlier. For example, if the programmed trigger distance is 0.1 inch, the programmed velocity is 25 in/sec and the interrupt interval is 15 milliseconds, the number of interrupts calculated in process step 348 will be 0.267.

However, in the Exact mode of operation it is desired that the distance traveled between system interrupts be an exact submultiple of the trigger distance interval. In order to accomplish this, the calculated number of interrupts per trigger distance U is incremented to the next integer value 1, 2, 3 . . . in process step 350. This ensures that the velocity will always be adjusted downwardly, and never increased.

The new velocity $V_E$ is then calculated in process step 352 utilizing the adjusted interrupt value $U_A$ from the relationship $$v_E = D1/U_A t_i$$

Thus, in the example given above, the initially calculated interrupt value U of 0.267 will be incremented in process step 350 to a value of $U_A = 1$, and the resulting exact velocity value $v_E$ calculated in process step 352 to be 6.67 in/sec. By reducing the manipulator arm speed to this value, it is ensured that the distance between trigger positions is an exact multiple, and in the present case the same as, the distance traveled by the manipulator arm between system interrupts.

In process step 354, the exact velocity $v_E$ is used as the velocity for the next span in the case where the call to Check Exact subroutine was made from process step 151. In the case where the call to the Check Exact subroutine was made from process step 173, the manipulator arm will decelerate to the new velocity at the end of the current move.

While the invention has been illustrated in some detail according to the preferred embodiment shown in the accompanying drawing, there is no intention to thus limit the invention to such detail. On the contrary, it is intended to cover all modifications, alternations and equivalents falling within the spirit and scope of the appended claims.

What is claimed is:

1. A programmable manipulator apparatus comprising:
   a. a moveable manipulator arm;
   b. actuator means for effecting motion of the arm; and
   c. a control system for moving the arm along a prescribed path of motion at a predetermined velocity including
      i. memory means including
         (a) means for storing informatio defining the location of a plurality of spaced points along said path of motion, and
         (b) programming means for storing information associated with a designated one of said points defining a predetermined distance interval;
      ii. and means for producing a plurality of triggers as said arm is moved by said actuator means along said path of motion between said designated point and one of said points adjacent to said designated point, the distance between adjacent ones of said triggers corresponding to said distance interval.

2. The apparatus according to claim 1 wherein said adjacent point precedes said designated point along said path of motion.

3. The apparatus according to claim 2 wherein said control system includes means for terminating the production of said triggers when said arm reaches said designated point as the arm is moved along said path of motion.

4. The apparatus according to claim 1 wherein said programming means includes means for storing information associated with a plurality of designated ones of said points defining a plurality of predetermined distance intervals.

5. The apparatus according to claim 4 including a plurality of distance interval values.

6. The apparatus according to claim 4 including means for producing a first set of triggers between a first point and a second adjacent point, and a second set of triggers between said second point and an adjacent third point.

7. The apparatus according to claim 6 wherein the distance interval between adjacent triggers of said first set is different from the distance interval between adjacent triggers of said second set.

8. The apparatus according to claim 1 wherein said trigger producing means includes
   a. means for establishing a reference position along said path of motion;
   b. means for calculating a distance interval displaced from said reference position along said path of motion corresponding to said predetermined distance interval;
   c. means for sensing the location of said arm along said path; and
   d. means responsive to said sensing means for producing a trigger when said arm reaches the end of said calculated interval.

9. The apparatus according to claim 8 wherein said reference position comprises one of said points preceding said designated point.

10. The apparatus according to claim 8 wherein said reference position comprises the location of a previously produced triggers.

11. The apparatus according to claim 8 including means for producing a plurality of temporally spaced interrupts and means for reducing the velocity of said arm so that said triggers are produced at integral multiples of said interrupts.

12. The apparatus according to claim 1 including a function element carried by said arm and means for operating said function element at one or more of said points, said triggers being produced irrespective of the operation of said function element.

13. The apparatus according to claim 1 including a plurality of programming means for separately storing information defining predetermined distance intervals associated with a plurality of different designated points and a trigger producing means responsive to each of said programming means for separately establishing a plurality of triggers between adjacent ones of said designated points.

14. The apparatus according to claim 1 including a function element carried by said arm, said triggers functioning to operate said function element while said arm is moving between said points.

15. The apparatus according to claim 1 including a function element carried by said arm, said function element including means for performing a plurality of functions in response to each of said triggers.

16. The apparatus according to claim 1 including a function element carried by said arm, said function element including means for performing a plurality of functions, a plurality of programming means for separately storing information defining predetermined distance intervals associated with a plurality of different designated points, and a trigger producing means responsive to each of said programming means for separately establishing a plurality of triggers between adjacent ones of said designated points, said function element producing a selected function in response to each of said separately established triggers.

17. The apparatus according to claim 1 including means for reducing the velocity of said arm in order to insure that said triggers occur at preselected locations between said points.

18. The apparatus according to claim 17 wherein said control system includes means for producing a plurality of interrupts, said velocity reducing means comprising means for producing said triggers at integral multiples of said interrupts.

19. The apparatus according to claim 18 wherein said velocity reducing means comprises:
   a. means for calculating the number of interrupts occurring during the distance interval D1 between adjacent triggers;
   b. means for incrementing said calculated interrupt number to the next higher integer value $V_A$; and
   c. means for calculating a new velocity value $V_E$ from the relationship $$V_E = (D1/U_A t_i)$$

where: $t_i$ = time interval between interrupts d. and, adjusting the arm velocity to the velocity $V_E$.

20. The apparatus according to claim 1 wherein said adjacent point precedes said designated point along said path of motion, said programming means including means for storing information associated with a plurality of designated ones of said points defining a plurality of predetermined distance interval values, means for producing a first set of triggers between a first point and a second adjacent point, and a second set of triggers between said second point and an adjacent third point, said trigger producing means further including means for establishing a reference position along said path of motion, means for calculating a distance interval displaced from said reference position along said path of motion corresponding to said predetermined distance interval, means for sensing the location of said arm along said path, and means responsive to said sensing means for producing a trigger when said arm reaches the calculated interval, and including a function element carried by said arm, said triggers functioning to operate said function element while said arm is moving between said points.

21. The apparatus according to claim 20 including a plurality of programming means for separately storing information defining predetermined distance intervals associated with a plurality of different designated points and a trigger producing means responsive to each of said programming means for separately establishing a plurality of triggers between adjacent ones of said designated points.

22. The apparatus according to claim 21 wherein said function element includes means for performing a plurality of functions, said function element producing a selected function in response to each of said separately established triggers.

23. The apparatus according to claim 22 including means for reducing the velocity of said arm in order to ensure that said triggers occur at preselected locations between said points, said control system including means for producing a plurality of interrupts, said velocity reducing means comprising
 a. means for calculating the number of interrupts occurring during the distance interval D1 between adjacent triggers;
 b. means for incrementing said calculated interrupt number to the next higher integer value $U_A$; and
 c. means for calculating a new velocity value $V_E$ from the relationship $$V_E = (D1/V_A t_i)$$

where: $t_i$ = time interval between interrupts d. and, adjusting the arm velocity to the velocity $V_E$.

24. A computer program for operating a programmable manipulator of the type having a movable manipulator arm, a computer for executing the program and actuator means responsive to the computer for effecting motion of the arm under control of the program, said program comprising
 a. means for storing a plurality of spaced points defining the desired path of motion of the manipulator arm;
 b. means for storing a predetermined distance interval associated with a designated one or more of said points;
 c. means for producing control signals for causing said actuator means to move the arm along the path of motion between adjacent ones of said points;
 d. means for establishing a reference position along the path of motion;
 e. means for calculating a distance interval displaced from said reference position corresponding to the predetermined distance interval along the path of motion;
 f. means for determining the location of the arm along the path of motion;
 g. means for producing a trigger when the arm reaches said calculated interval such that a multiplicity of triggers are produced between adjacent ones of said points spaced by said predetermined distance interval; and
 h. outputting said triggers to one or more utilization devices.

25. The computer program according to claim 24 further including:
 a. means for producing a plurality of interrupts;
 b. means for calculating the number of interrupts occurring during the distance interval D1 between adjacent triggers;
 c. means for incrementing said calculated interrupt number to the next higher integer value $U_A$; and
 d. means for calculating a new velocity value $V_E$ from the relationship $$V_E = (D1/U_A t_i)$$

where: $t_i$ = time interval between interrupts e. and, adjusting the arm velocity downwardly to the velocity $V_E$ such that the triggers occur at exact preselected locations between said points.

* * * * *